United States Patent [19]

Shiota

[11] Patent Number: 5,162,842
[45] Date of Patent: Nov. 10, 1992

[54] PHOTOGRAPHIC PRINTER

[75] Inventor: Kazuo Shiota, Kanagawa, Japan

[73] Assignee: Fuji Photo Film Co., Ltd., Kanagawa, Japan

[21] Appl. No.: 813,631

[22] Filed: Dec. 26, 1991

[30] Foreign Application Priority Data

Dec. 25, 1990 [JP] Japan ................... 2-414448

[51] Int. Cl.⁵ .......................................... G03B 27/52
[52] U.S. Cl. ...................................... 355/40; 355/54; 355/77
[58] Field of Search .................. 355/54, 75, 77, 40

[56] References Cited

U.S. PATENT DOCUMENTS

| 3,910,698 | 10/1975 | Sone et al. | 355/54 |
| 3,973,344 | 8/1976 | Frankel | 355/54 X |
| 4,026,652 | 5/1977 | Spence-Bate | 355/54 |
| 4,188,114 | 2/1980 | Gensike et al. | 355/54 |
| 4,866,476 | 9/1989 | Kogane et al. | 355/40 |
| 4,908,657 | 3/1990 | Kogane | 355/75 |
| 4,918,483 | 4/1990 | Otake | 355/40 |
| 4,959,683 | 9/1990 | Otake et al. | 355/28 |

FOREIGN PATENT DOCUMENTS

| 62-103625 | 5/1987 | Japan . |
| 62-208028 | 9/1987 | Japan . |
| 1-279231 | 11/1989 | Japan . |
| 1-279250 | 11/1989 | Japan . |
| 1-289948 | 11/1989 | Japan . |

Primary Examiner—Richard A. Wintercorn
Attorney, Agent, or Firm—Sughrue, Mion, Zinn, Macpeak & Seas

[57] ABSTRACT

A photographic printer has at least two film carriers which are moved together in a direction perpendicular to a film transporting direction. A photographic film is subjected to light measurement while drawn out from a film cartridge on the first film carrier and, simultaneously, another photographic film is subjected to printing while rewound back into a film cartridge on the second film carrier. The printing is performed according to the result of previously performed light measurement. Upon completion of the printing in the second film carrier, the respective film carriers are moved to change over the operation steps such that the photographic film on the first film carrier is subjected to printing, and that the film cartridge into which the printed photographic film has been rewound is replaced by a new film cartridge on the second film carrier.

16 Claims, 10 Drawing Sheets

PHOTOGRAPHIC PRINTER

BACKGROUND OF THE INVENTION

1. Field of the Invention

The present invention relates to a photographic printer, particular to a photographic printer for printing photographic films of a type that are individually wound into cartridges after development. The films are subsequently drawn out of the cartridges during printing.

2. Description of the Related Art

Photofinishing systems are known in which various photographic data such, as print magnification data or aspect ratio data for pseudo zooming or panoramic photographing, respectively, is recorded in an IC memory or magnetic recording medium during photographing and/or after development, so as to perform printing with reference to the recorded data (U.S. patent application No. 07/757,353 filed on Sep. 10, 1991; Japanese Laid-open Patent Publications No. 62-103625, 62-208028, 1-279231, 1-289948).

Although conventional photographic film is cut into pieces after development and printing, if a photographic film having a magnetic recording layer is cut into pieces, it is possible that the data recorded on the magnetic recording layer may be divided so as to render the data unreadable. To avoid damaging the data recorded on the photographic film, a storage cartridge for holding the photographic film after development, in the form of a roll therein, without being cut into pieces has been suggested (Japanese Laid-open Patent Publication No. 1-279250).

It is also known that, in a large scale photofinishing laboratory, wherein a great number of strips of photographic film are developed and printed, a plurality of, e.g., 40 to 60, strips of photographic films may be spliced into a long strip of film, and that the long strip can be wound in a roll. This is because if a large number of strips of photographic films were processed individually, by manually replacing each strip, as in a conventional mini-laboratory system, the time for changing the strips would be enormous compared with the actual processing time, so that the processing efficiency would be drastically lowered. Accordingly, it is also inefficient to process the above described new type cartridge films, wherein developed photographic films are rebound into individual cartridges, by manually handling one film cartridge after another.

SUMMARY OF THE INVENTION

To achieve the above and other objects, an autoprinter of the present invention has a plurality of film carriers, each of which consists of a film unwinding-rewinding section for propelling a leader portion of a photographic film out of a cartridges, by rotating a spool in a direction to unwind the photographic film, and for rewinding the photographic film into the film cartridge by rotating the spool in the opposite direction. A film transporting section is provided for drawing out the photographic film after being propelled out of the cartridge. An exposure opening is disposed in the film transporting section, and a film reservoir for accumulating the photographic film drawn out from the cartridge is also provided. The film carriers are held on a table such that the film transporting sections are arranged parallel to each other. The table is shifted by a shifter in a direction perpendicular to the film transporting section so as to selectively place the exposure opening of one of the film carriers in a printing position of a printing section.

While a photographic film is subjected to printing on the one film carrier, a cartridge is replaced by a new cartridge and a photographic film is drawn out from the new cartridge on another film carrier. When the printing process is completed on the one film carrier, and the film drawing out process is completed on the other film carrier, the shifter is activated so as to change over the processing steps to be executed in the other film carrier.

According to a preferred embodiment, an autoprinter has a single printing section, two light measuring section disposed on opposite sides of the single printing section, and two parallel film carriers which are alternately placed in the exposure section and either of the first and second light measuring sections. The film carriers have the same construction as described above, and are held on a table which is shifted by a shifter in a direction perpendicular to the film transporting direction of the film carriers. The controller controls the shifter, the printing section and the light measuring section such that a photographic film on the first film carrier whose exposure opening is placed in the printing position, is subjected to at least printing and rewinding, while replacement of a cartridge by a new cartridge, and drawing of a photographic film from the new cartridge is accomplished. Light measurement of the photographic film is executed in the second film carrier which is placed in either of the light measuring sections.

When the predetermined processing steps are completed in the respective film carriers, the shifter is activated so as to displace the first film carrier from the printing section and place it into either of the light measuring sections and, simultaneously, place the second film carrier into the printing position. While the photographic film on the second film carrier, which is now placed in the printing position, is subjected to printing and rewinding, the cartridge on the first film carrier is replaced by a new cartridge, and a photographic film is subjected to light measurement while being drawn out from the new cartridge.

As described above, because processing steps necessary for printing are shared by at least two film carriers, it becomes possible to perform printing in rapid succession at a single exposure position. Furthermore, it is not necessary to splice a large number of photographic films into a long roll of film. Because rolling up a spliced long film and interrupting the operation of the printer so as to manually replace the film roll by a new film roll is eliminated, the efficiency of the present invention is higher than that of the conventional printers which require the film splicing and roll-up process and the film roll changing process.

The individual photographic films can be directly subjected to printing without the need for removal from the film cartridge. This facilitates handling of the photographic film as well as protection of the photographic film from dust and scratch.

Furthermore, because the photographic film is not cut into pieces even after printing, collation between print order data, photographic data and other data and the image frames is ensured. In the photographic printer of the present invention, all the film cartridges can be handled in a continuous operation, and subjected to the same printing sequence, independently of whether initial printing or extra printing is desired.

BRIEF DESCRIPTION OF THE DRAWINGS

The above and other objects and advantages will become more apparent from the following detailed description when read in connection with the accompanying drawings, wherein like reference numerals designate like or corresponding parts throughout the several views, in which.

DETAILED DESCRIPTION OF THE PREFERRED EMBODIMENTS

Figure 1:
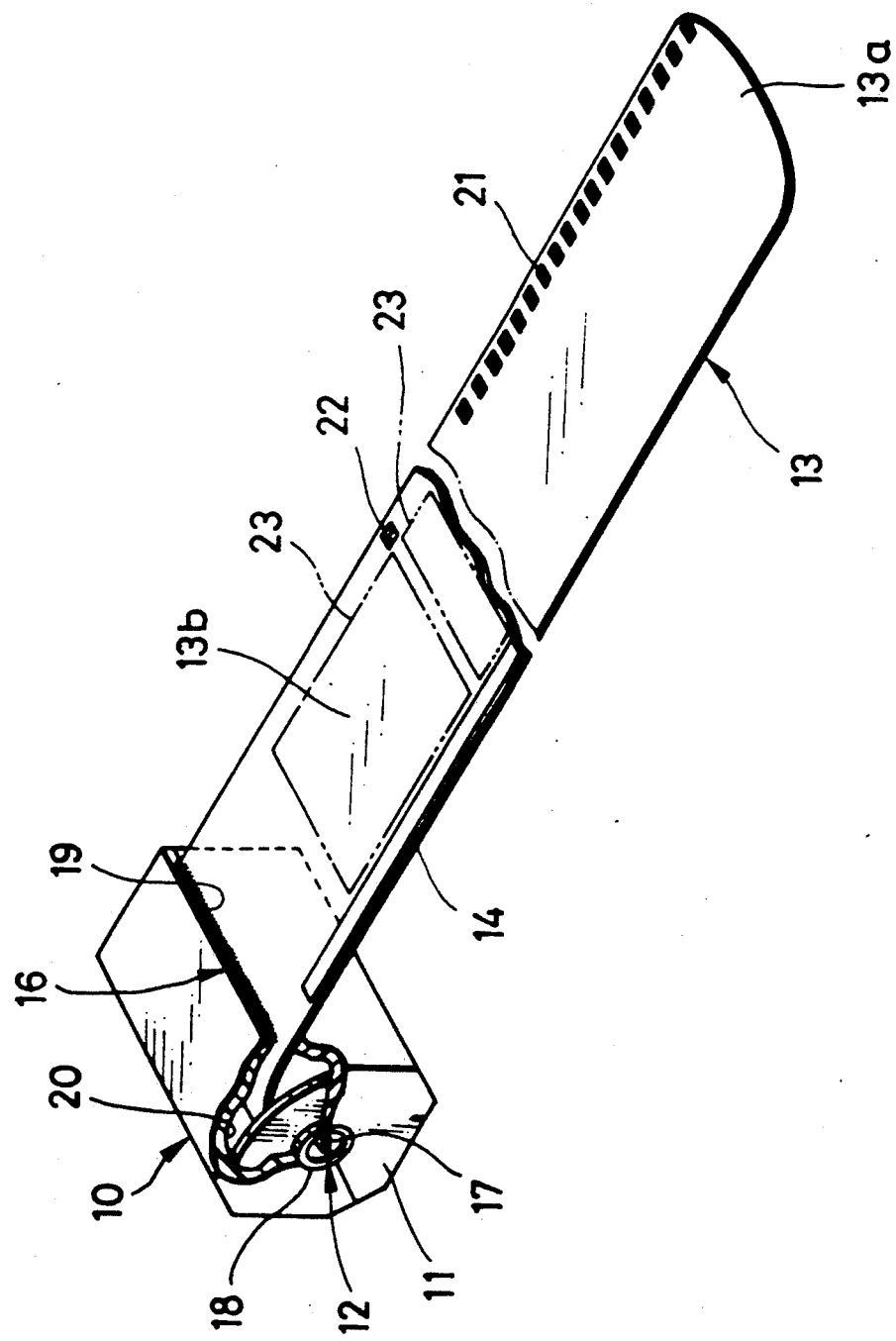
FIG. 1 illustrates a film cartridge, the photographic film of which has photographic data recorded on a magnetic recording layer thereof.

FIG. 1 shows a new type film cartridge 10 which is capable of recording photographic data, or the like. The film cartridge 10 is constructed of a cartridge shell 11, a spool 12 rotatably mounted in the cartridge shell and a photographic film 13 attached at one end to the spool 12. The essential difference between the photographic film cartridge 10 and conventional cartridges, is that the photographic film 13 has a magnetic recording layer 14 for recording photographic data such as exposure condition data, print order data, film type data and other various data, and that the photographic film cartridge 10 has a film propelling function, i.e., it is possible to propel the leader portion 13a of the photographic film 13 outside the cartridge shell 11 by rotating the spool 12 in a direction to unwind the photographic film 13. Although the magnetic recording layer 14 is formed as a recording track extending beside image frames 23, it is also possible to form a transparent magnetic recording layer over one side surface of the photographic film 13.

The cartridge shell 11 is formed in the shape of a polygonal box by joining shell halves molded from synthetic resin The cartridge shell 11 is provided with a film passage mouth 16 for passage of the photographic film 13, and openings 15 for supporting the spool 12 and for exposing a coupling end 17 of the spool 12 to the outside. Plush, or light trapping fabric, 19 is attached to the inside of photographic film passage mouth 16. A film containing chamber 20, defined inside the cartridge shell 11, has an internal diameter substantially equal to the maximum diameter of the photographic film 13 as wound about the spool 12.

When the spool 12 is rotated in the film unwinding or propelling direction, the film leader 13a is propelled outside the cartridge shell 11 through the photographic film passage mouth 16 while being guided along the photographic film containing chamber 20. Such a new type film cartridge is disclosed in more detail in U.S. patent application Nos. 07/650,350 and 07/739,374 filed respectively on Feb. 4, 1991 and Aug. 2, 1991. It is to be noted that the cartridge shell may also be of a cylindrical shape similar to conventional designs, although the polygonal cartridge shell 11 is preferable to ensure stability when stacking a plurality of film cartridges 10, on top of one another for storage.

The end of the film leader 13a is rounded so as to reduce the resistance to feeding of the photographic film 13 when propelling the film leader 13a through the photographic film passage mouth 19. One lateral side of the film leader 13a is provided with perforations 21 so as to engage with a sprocket of the camera (not shown). Accordingly, the photographic film 13 can be fed toward a film take-up spool (not shown) after being let out of the cartridge shell 11. Thereafter, the perforations 21 engage with claws on the photographic film take-up spool, so that the photographic film 13 is wound up on the photographic film take-up spool. The image forming area 13b is provided with positioning perforations 22, one for each of the image frames 23. The perforations 21 are detected by the camera, either mechanically or optically, in order to position each of the image frames 23 on an exposure aperture of the camera.

Figure 2:
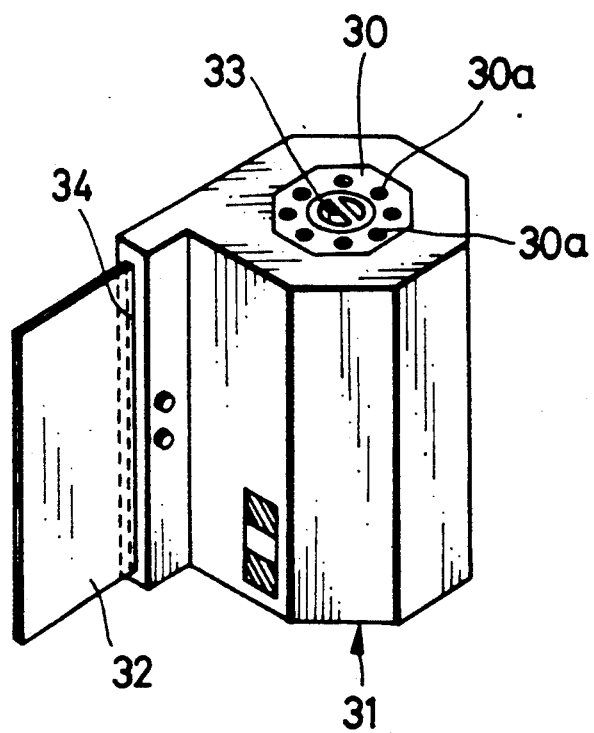
FIG. 2 illustrates a film storage cartridge adopted in a photographic printer of the invention.

During and/or after photographing, the camera records various photographic data such as light source data, principal subject position data, photographic date and time data, print magnification data for pseudo zooming, panoramic photographing order data, and other data onto the magnetic recording layer 14 of the photographic film 13. Such a camera capable of recording photographic data is disclosed, for example, in U.S. patent application No. 07/753,770. After exposure of all available image frames, the photographic film 13 is forwarded to a photofinishing laboratory, wherein the photographic film 13 is developed and then wound into a storage cartridge 31 having an IC memory 30 (see FIG. 2). On winding the developed film 13 into the storage cartridge 31, the photographic data recorded on the magnetic recording layer 14 is read and recorded in the IC memory 30. The storage cartridge 31 fundamentally has the same construction and shape as the above-described film cartridge 10, except that the storage cartridge 30 has the IC memory 30 and a connecting sheet 32, attached to spool 33 thereof and protruding outward through a film passage mouth 34. The developed film 13 is connected to the connecting sheet 32 so as to wind the developed film 13 into the storage cartridge 31.

Figure 3:
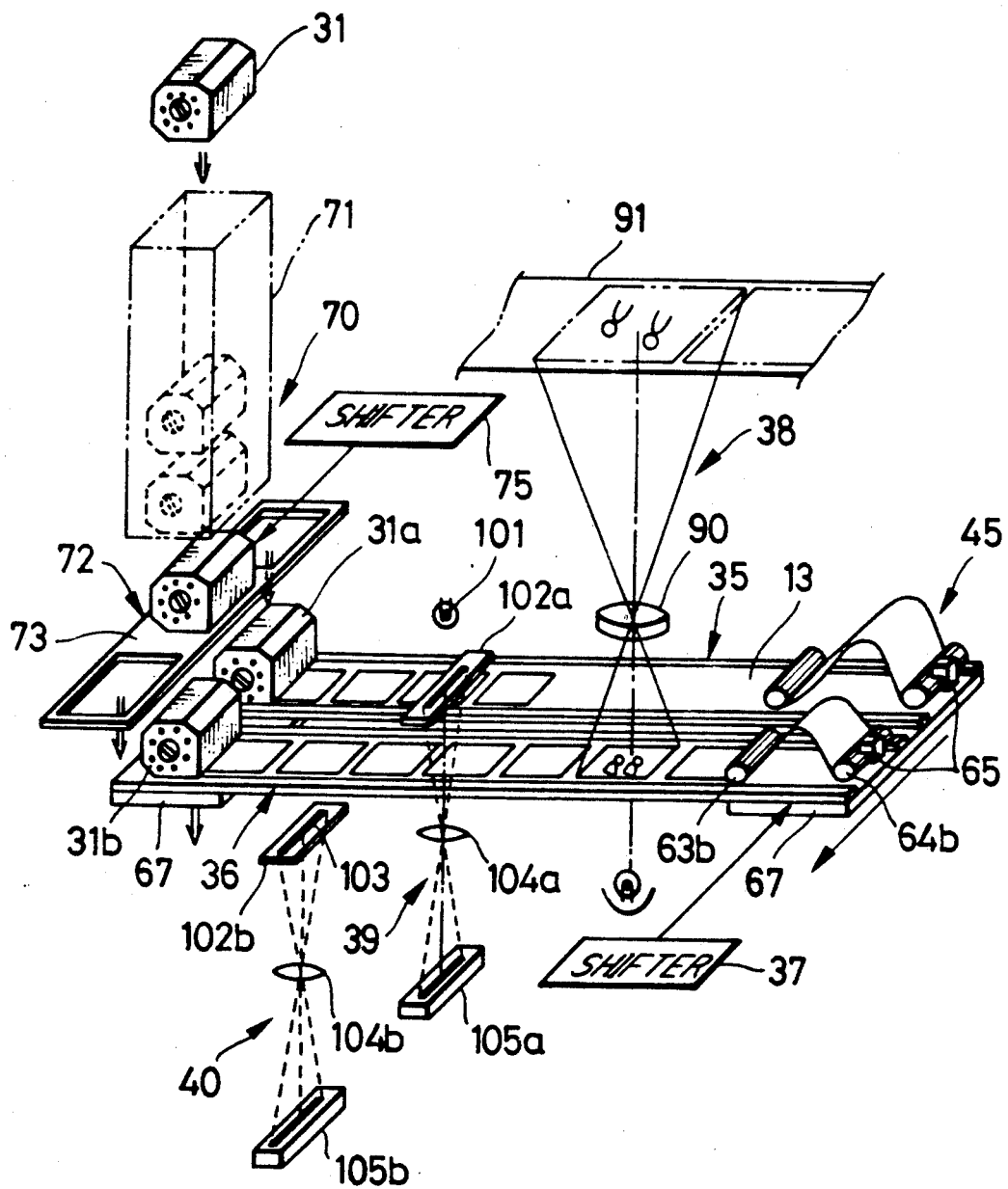
FIG. 3 is a perspective view illustrating essential parts of the photographic printer.
Figure 4:
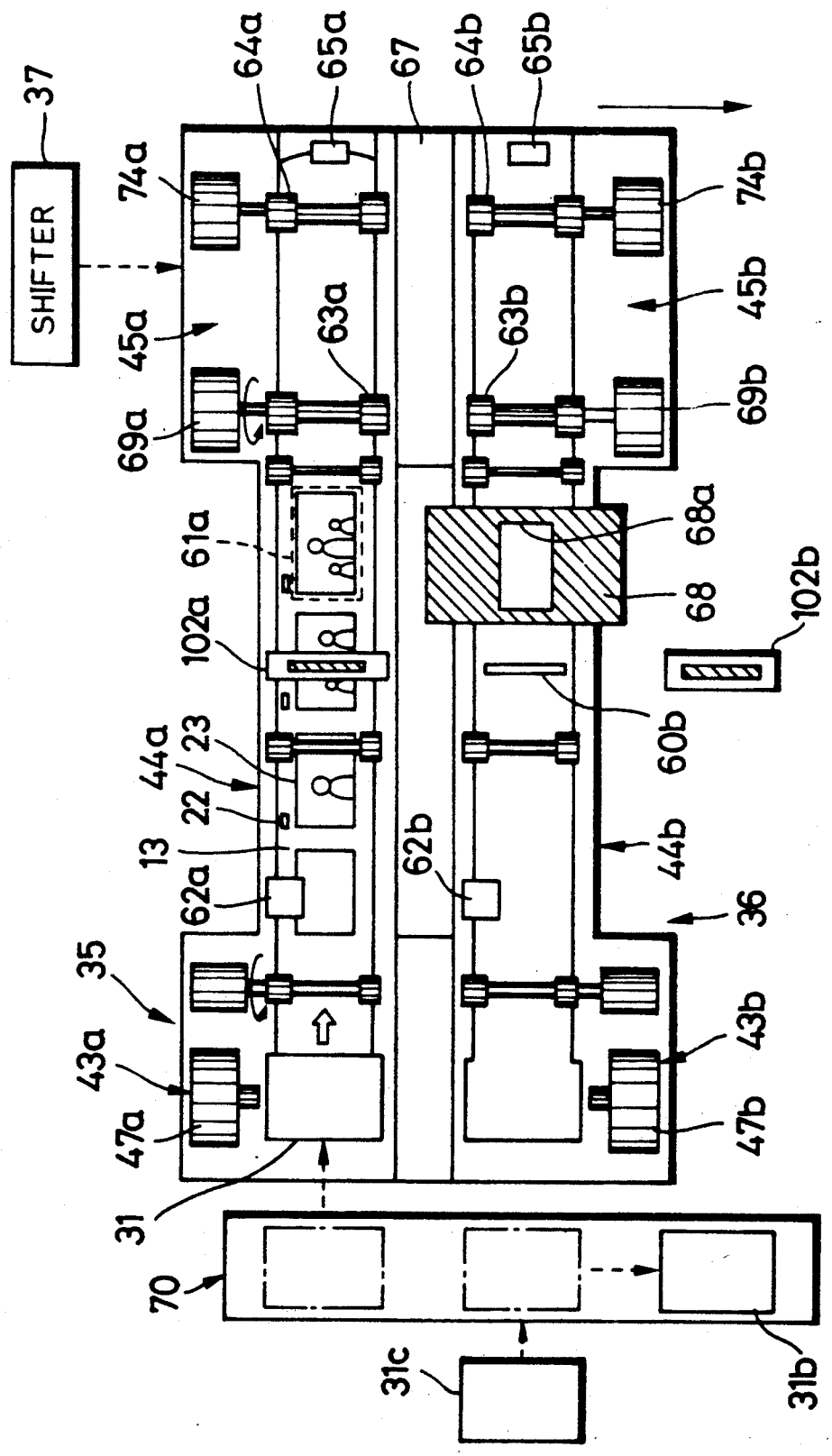
FIG. 4 is a plane view illustrating substantially the same parts shown in FIG. 3.

The developed film 13 wound into the storage cartridge 31 is placed in a printer-processor, as shown in FIG. 3. The printer-processor has two film carriers 35 and 36, which are moved by a shifter 37 to be alternately placed in an exposure position of a printing section 38. While one of the film carriers 35 and 36, for example, the first film carrier 35 is placed in the printing position, the other, or second, film carrier 36 is placed in one of two light measuring sections 39 and 40. As shown in FIG. 4, the film carriers 35 and 36 are provided with film unwinding-rewinding sections 43a and 43b, transporting sections 44a and 44b, and film reserving sections 45a and 45b, respectively. Because the film carriers 35 and 36 have the same construction, the construction of the film carriers 35 and 36 is hereinafter described with respect to the film carrier 35 only, but is applicable to the other film carrier 36 also.

Figure 5:
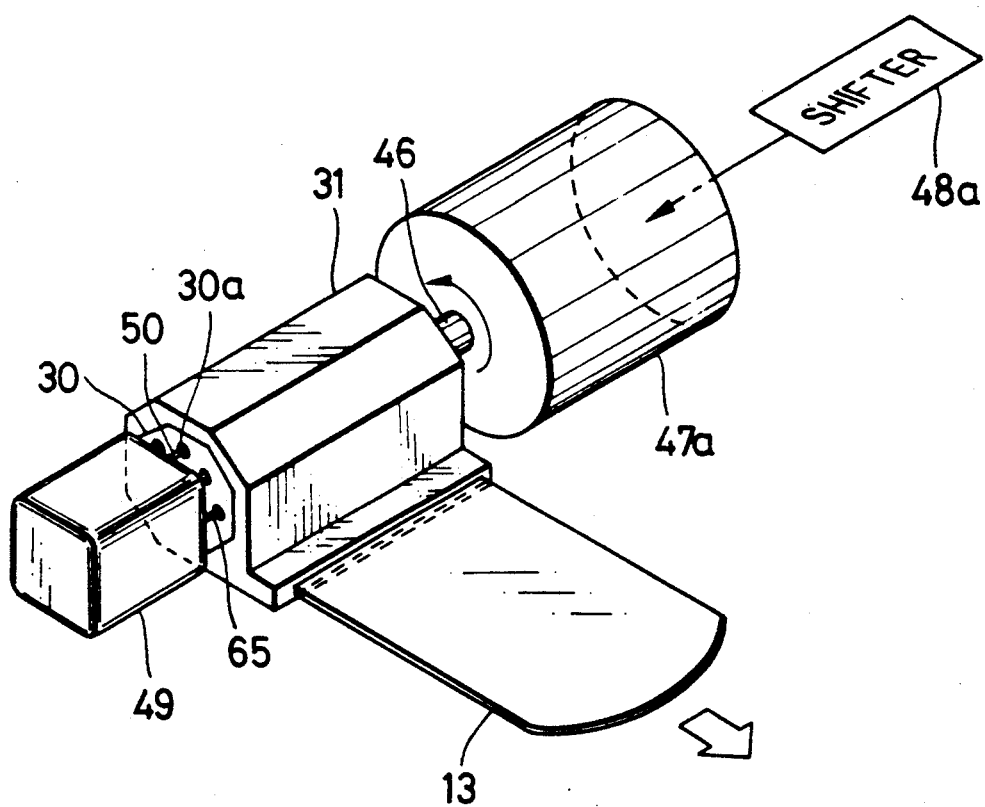
FIG. 5 is an enlarged perspective view of the film unwinding-rewinding section shown in FIG. 4.

The film unwinding-rewinding section 43a is constructed of a spool drive shaft 46a, a bidirectional motor 47a for rotating the spool drive shaft 46a, a shifter 48a for shifting the spool drive shaft 46a in axial direction, and a plug 49 for writing and reading the IC memory 30 of the cartridge 31 placed thereon. As shown in FIG. 5, the plug 49 is provided with contact pins 50 disposed correspondingly to contacts 30a of the IC memory 30. The plug 49 is connected to a controller 100 as shown in FIG. 6.

Figure 6:
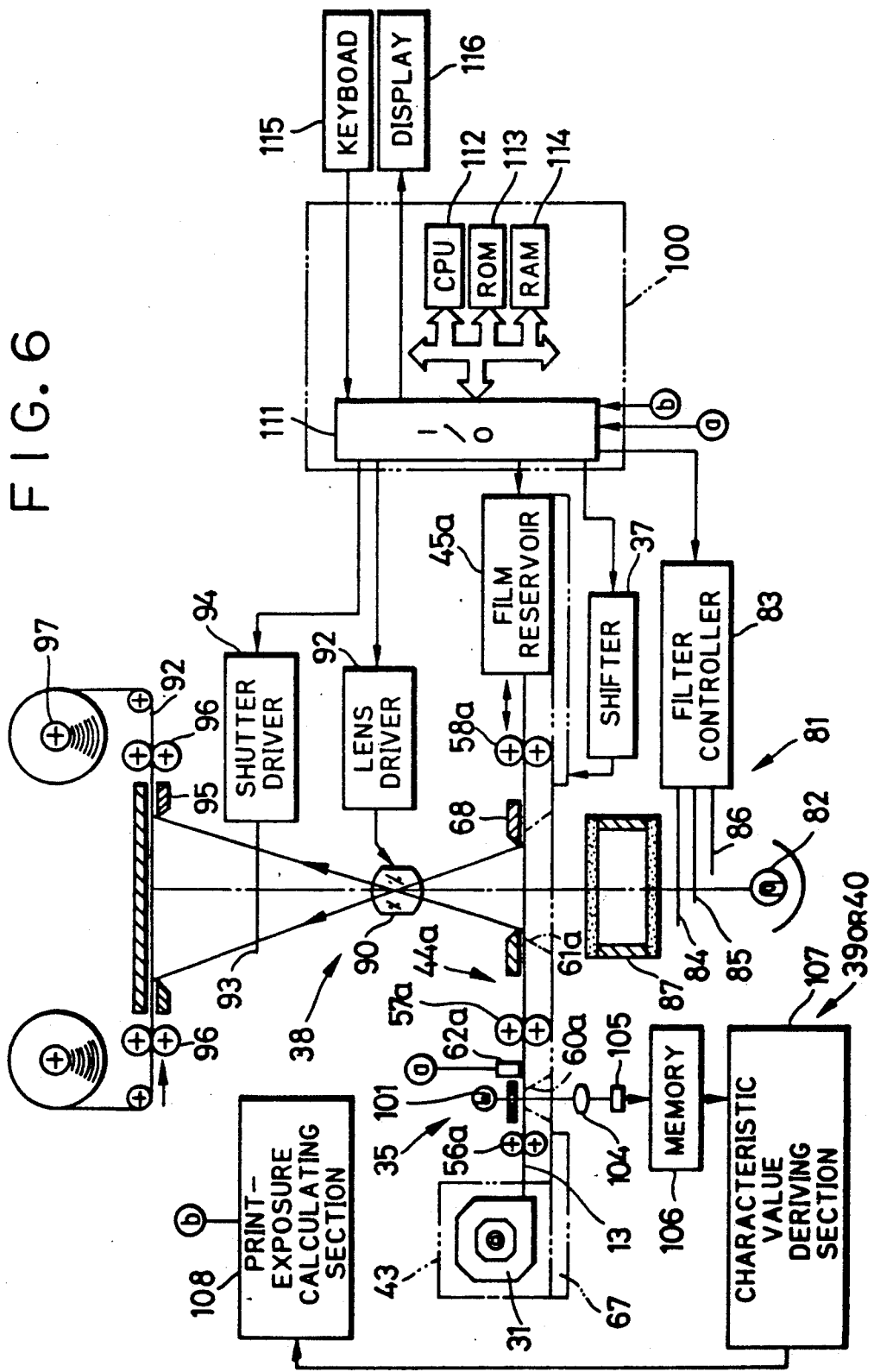
FIG. 6 schematically illustrates the overall construction of the photographic printer.
Figure 7:
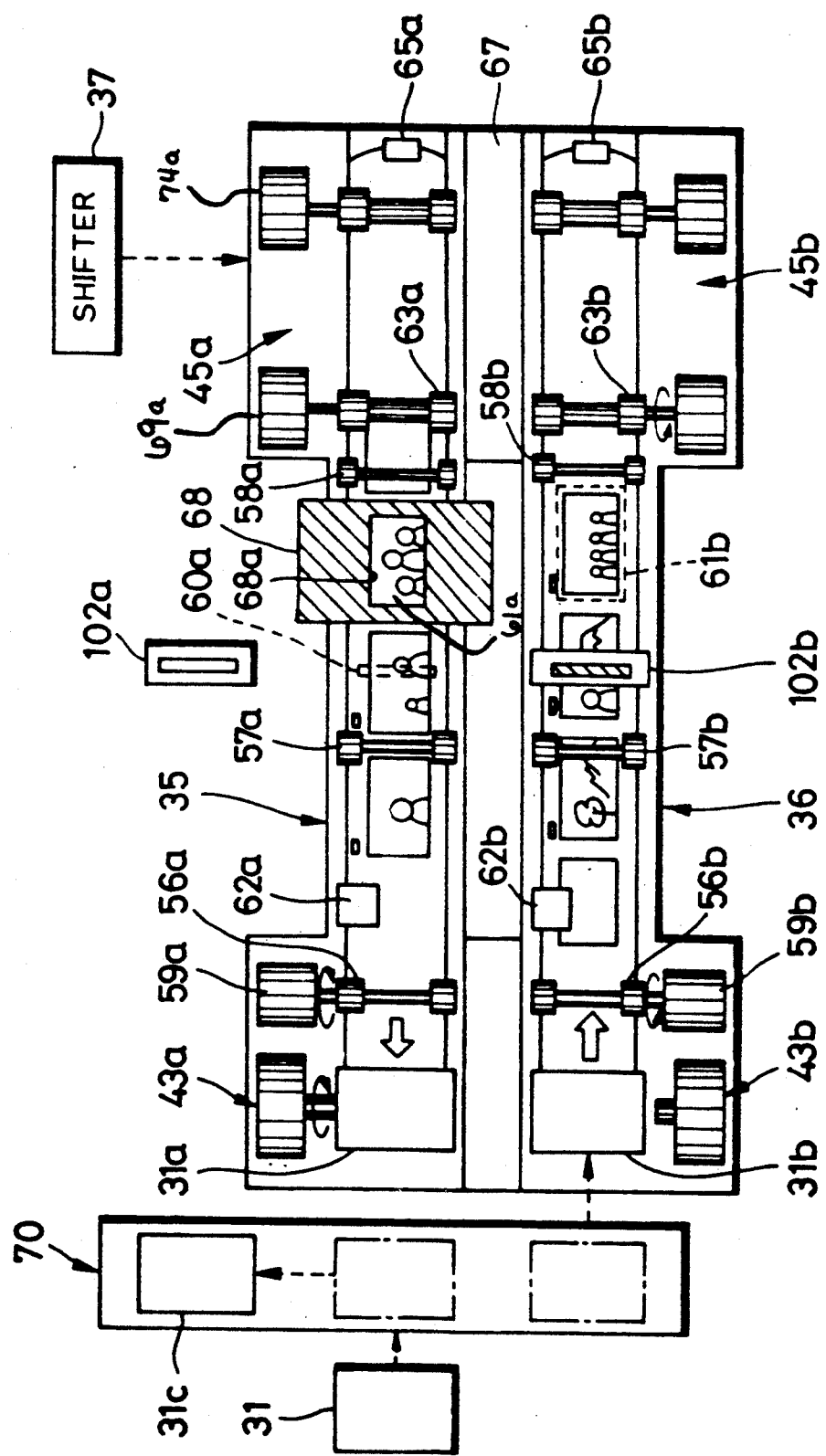
FIG. 7 is a view similar to FIG. 4 but illustrating the photographic film carrier and the shifter in another state.

As shown in FIGS. 6 and 7, three pairs of film feed rollers 56a, 57a and 58a of the transporting section 44a draw out the film 13 from the storage cartridge 31 after the film leader 13a is propelled out storage cartridge 31 at the film unwinding-rewinding section 43a. These film feed rollers 56a, 57a and 58a are rotated by a motor 59a, in concert with each other. The transporting section 44a is formed with a slit 60a for light measurement and an opening 61a for exposure. Furthermore, a perforation sensor 62a is disposed in the film transporting section 44a so as to detect the positioning perforations 22 for positioning each of the image frames 23 in the exposure opening 61a. The film reserving sections 45a stores the film 13 in the form of a loop between a first and second pairs of rollers 63a and 74a which are rotated by motors 69a and 74a, respectively. At the exit of the second roller pair 64a is disposed a film leader sensor 65a. Upon detecting the film leader 13a by the film leader sensor 65a, the second roller pair 64a stops rotating while the first roller pair 63a continues to rotate, so that the photographic film 13 is stored in the film reserving section 45a.

The two film carriers 35 and 36 are mounted parallel to each other on a shift table 67. The shift table 67 is horizontally moved by the shifter 37 in a direction perpendicular to the film transporting direction, such that the exposure opening 61a or 61b of either one of the film carriers 35 and 36 is placed in a film mask 68 having an aperture 68a disposed at the exposure position of the printing section 38. Simultaneously with placing the exposure opening 61a or 61b of the one film carrier 35 or 36, the slit 60b or 60a of the other film carrier 36 or 35 is placed in a position corresponding to the light measuring sections 40 or 39, respectively (see FIG. 3).

A cartridge feed section 70 is disposed over the film unwinding-rewinding sections 43a and 43b of the film carrier 35 and 36. As shown in FIG. 3, the cartridge feed section 70 is constructed of a cartridge storage channel 71 and a delivery mechanism 72. The delivery mechanism 72 comprises a delivery plate 73 on which one of the cartridges 31 from the storage channel 71 is successively placed. The cartridge 31 on the delivery plate 73 is shifted by a shifter 75 to be placed into either of the film unwinding-rewinding section 43a or 43b. Instead of this cartridge feed section 70 having the delivery mechanism 72, it is possible to provide separate cartridge feed sections for each of the film carriers 35 and 36.

As shown in FIG. 6, the printing section 38 comprises a light source portion 81 disposed below the exposure position. The light source portion 81 consists of a light source 82, a filter controller 83 for controlling the intensity and color balance of three color components of printing light from the light source, and a mixing box for equalizing printing light passing through three color filters 84, 85 and 86. A boom lens 90 is disposed above the exposure position. The boom lens 90 focuses each of the image frames placed on the exposure opening 61a or 61b of one of the film carriers 35 and 36 which is placed under the film mask 68, onto photosensitive color paper 91. A driver 92 sets a print magnification of the zoom lens 90 according to a magnification signal from the controller 100. A shutter 93 is disposed between the zoom lens 90 and the color paper 91, and is controlled by a shutter driver 94. A paper mask 95 is disposed in the front of the photosensitive surface side of the color paper 91 at the printing position. At the exit of the paper mask 95 are disposed a pair of paper feed rollers 96 and a film take-up reel 97 for winding up the printed paper 91. The color paper 91 wound on the take-up reel 97 is processed in a paper processor and, thereafter, is cut into individual print sheets.

Although FIG. 6 shows the film carrier 35 alone wherein the exposure opening 61a is placed in the print position 38, and the slit 60a corresponds to the first light measuring section 39, for clarity, it is the slit 60b of the other film carrier 36 that is actually placed in the second light measuring section 40 when the exposure opening 61a is placed in the print position 38, as described above.

The first and second light measuring sections 39 and 40 are disposed on opposite sides of the print position 38 in the moving direction of the shift table 67 (see FIG. 3). The light measuring sections 39 and 40 have a respective light source 101 disposed above the photographic film 13. Below the light source 101 is disposed slit plate 102a or 102b having a slit 103 traversing the photographic film 13. Light from the light source 101 passes through the slit 103, the photographic film 13 and the slit 60a or 60b, and is focused by the lens 104 onto a line sensor 105a or 105b, for example, a CCD line sensor, respectively. Photometric signals from the line sensor 105a or 105b are stored in a memory 106 for each image frame in synchronism with film transporting. It is to be noted that the slit plates 102a and 102b may be disposed below the film carriers 35 and 36.

A characteristic value deriving section 107 reads the memory 106 so as to derive various characteristic values necessary for calculating a print-exposure from light measuring data. A print-exposure calculating section 108 calculates a print-exposure amount based on the characteristic values derived from the characteristic value deriving section 107 in accordance with a conventional print-exposure calculation formula. The controller 100 determines respective positions of the filters 84, 85 and 86 depending on the print-exposure amount, and controls the filter controller 83 correspondingly.

The controller 100 is a conventional microcomputer, or the like, which consists of an I/O interface 111, a CPU 112, a ROM 113, a RAM 114, a keyboard 115 and a display 116. The I/O interface 111 is adapted to be connected to the IC memory 30 through the plug 49 so as to read various data from the IC memory 30 as well as to write print data detected during printing into the IC memory 30. The controller 100 also sequentially controls other sections of the printer-processor according to a program stored in the ROM 113.

The above-described printer-processor operates as follows:

A plurality of the storage cartridges 31 containing the developed films 13 therein are inserted in the cartridge storage channel 71. The cartridge feed section 70 places a first cartridge 31a onto the film unwinding-rewinding section 43a of the one film carrier 35. Then, the film data, photographing data, print order data and other data are read from the IC memory 30 of the cartridge 31a placed onto the film carrier 35 through the plug 49.

and is stored in the RAM 114. Thereafter, the developed photographic film 13 is drawn out from the cartridge 31a toward the transporting section 44a.

During drawing of the film, the first light measuring section 39 photometrically detects image signals of each image frame of the film 13 transported therethrough, as shown in FIG. 4. The detected image signals are written in the memory 106. The characteristic value deriving section 107 derives various characteristic values based on the signals read from the memory 106. Based on the various characteristic values, the print-exposure calculating section 108 calculates a print-exposure amount for each image frame. The image frames after light measurement are accumulated in the film reservoir 45a in the form of a loop.

When the film 13 and the connection sheet 32 have been fully drawn out of the cartridge 31a, the connecting sheet 32 is designed to be long enough to enable a last image frame on the film 13 to be placed on the exposure opening 61a, all of the image frames have been measured by the first light measuring section 39. Then, the shifter 37 is activated to move the shift table 67 so as to place the first film carrier 35 into the printing section 38. Simultaneously, the second film carrier 35, that was placed in the printing section 38, is moved into the second light measuring section 40. In the same way as for the first film carrier 35, a second film cartridge 31b is placed in the film unwinding-rewinding section 43b of the second film carrier 36, so that the photographic film 13 is drawn out to be measured by the second light measuring section 40, as shown in FIG. 7.

On the other hand, the photographic film 13 on the first film carrier 35 is rewound into the cartridge 31a frame by frame by rotating the spool 33 of the storage cartridge 31a in the winding direction, while the positioning perforations 22 are detected so as to properly place each of the image frames to be printed onto the exposure opening 61. The image frame, placed on the exposure opening 61, is printed onto the color paper according to the print-exposure amount determined based on the photometric signal. After printing of all necessary image frames, the film 13 is fully wound into the cartridge 31a. During winding the film leader 13a into the cartridge 31a, or immediately thereafter, density correction data, color correction data and other print data are written in the IC memory 30 along with the corresponding frame number data, if such data have not yet been stored. Furthermore, if various photographic data recorded on the magnetic recording layer 14 of the photographic film 13 was not written in the IC memory 30 during development, that data is also written concurrently with the print data. After writing the data, the cartridge 31a is removed from the film unwinding-rewinding section 43a.

When the first film carrier 35 completes the above-described printing process, and the second film carrier 36 completes the above-described light measuring process, then the shifter 37 is activated to shift the position of the film carriers 35 and 36 relative to the printing section 38 and the light measuring sections 39 and 40. And a third storage cartridge 31c is placed in the unwinding-rewinding section 43a of the first film carrier 35. While the second film carrier 36 performs printing with respect to the second cartridge 31b, the first film carrier 35 performs light measurement with respect to the third cartridge 31c. In the same way as above, a fourth and following cartridges 31 are sequentially subjected to printing.

Figure 8:
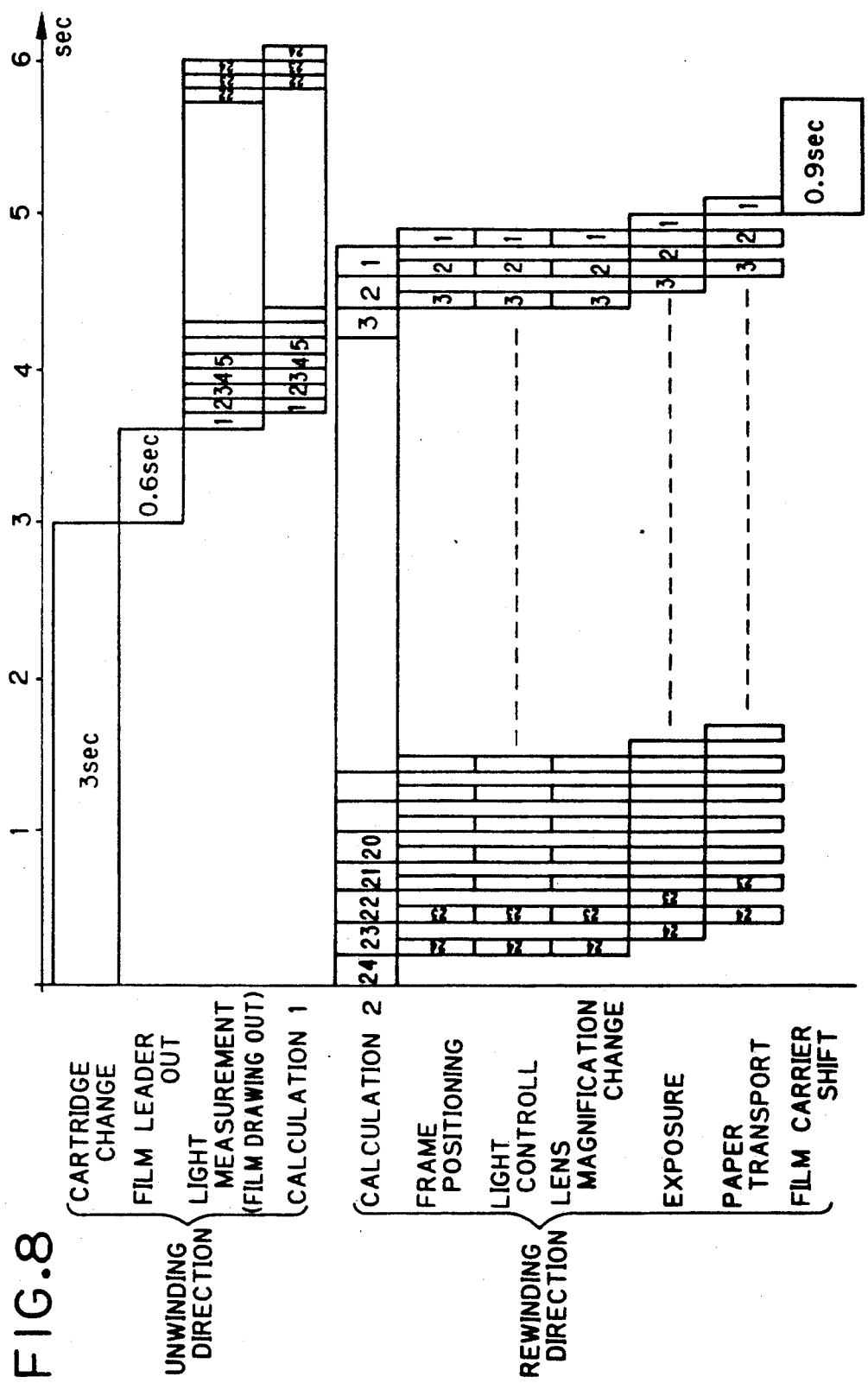
FIG. 8 is a timing chart of operation of a first embodiment of the present invention.

FIG. 8 shows timing charts of the above-described procedure. In FIG. 8, it is to be premised that the print sequence cycle time for each image frame and each exposure time in the cycle time are predetermined to be 0.2 second and 0.1 second, respectively, and that the photographic films to be printed are 24-frame films. In a film unwinding sequence, exchange of the cartridges, film leader propelling, light measurement and first print-exposure calculation are performed. In a film rewinding sequence, second print-exposure calculation, frame advancing, print light control, changing of print magnification, printing, paper advancing, and film carrier shifting and the like are performed. As the second print-exposure calculation, for instance, calculation for determining a print-exposure amount for the last image frame continued from the film unwinding sequence, and calculation based on the whole light measurement data detected from all the image frames to be printed in the individual film, such as calculation for detecting the continuity of finished prints of two similar image frames are performed.

It is to be noted that the numerals 1 to 24 indicate the frame number of the image frame presently processed. According to this embodiment, light measurement and a part of print-exposure calculation are performed in the unwinding sequence, and the remaining print-exposure calculating section 98. Print-exposure calculation considering photographic data recorded in a recording medium such as a magnetic recording layer on a photographic film is disclosed in more detail in the above-mentioned U.S. patent application No. 07/753,770. In the case of an image frame for which pseudo zooming data is recorded, the print magnification of the zoom lens 90 is determined based on this data. In the case of an image frame for which panoramic print order data is recorded, the aperture size of the paper mask 95 is set at a designated aspect ratio, while the print magnification of the zoom lens 90 is set at a value allocated to the panoramic print. Printing is performed after thus adjusting necessary elements according to the print order data.

If any photographic prints are not properly finished and, therefore, need be printed once again, re-printing data for those photographic prints are entered in the IC memory 30 by means of a reception unit or the like. The re-printing data includes, for example, frame number designation data for designating the image frame to be printed again and exposure correction data for this image frame. After the entrance of the re-printing data, the cartridge for re-printing is placed in the cartridge storage channel 71 in the same way as the cartridges for initial printing. When the cartridge for re-printing is placed onto the film unwinding-rewinding section 43a or 43b, the re-printing data are read from the IC memory 30, based on which the image frame to be printed again is printed considering the exposure correction data. Extra-printing can be performed in the same way as the re-printing. It is to be noted that the reception unit includes a plug similar to the plug 49 for writing and reading the IC memory 30 of the storage cartridge 31. It is possible printing extra prints, to additionally enter panoramic print order data, pseudo zooming data, and trimming print data including center designating data in the IC memory 30, by means of the reception unit, or the like.

Figure 9:
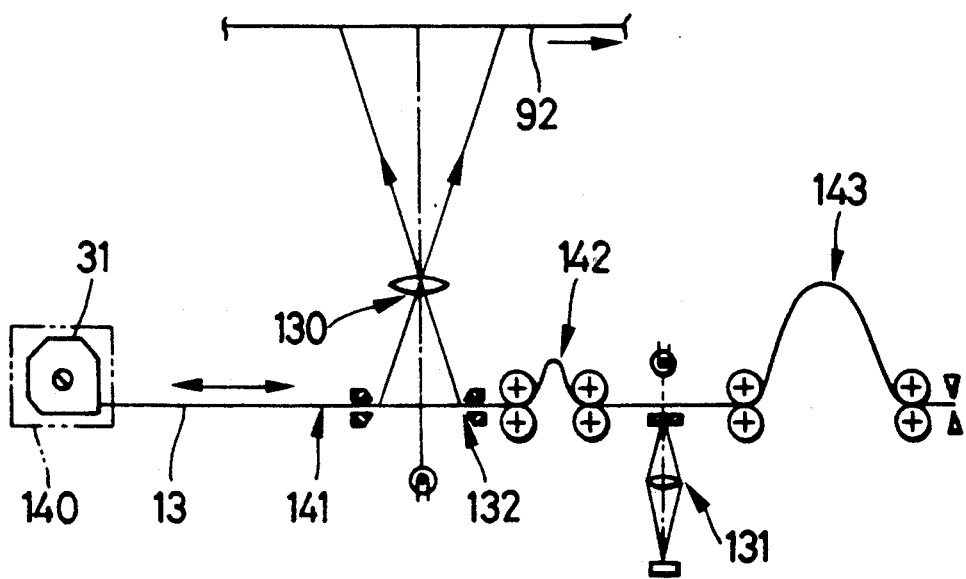
FIG. 9, illustrates essential parts of a second embodiment of the present invention.

Although the above-described embodiment is provided with a single printing section and two light measuring sections, so as to allow printing of one film while measuring another film, it is also possible to provide a printing line consisting of a single printing section 130 and a single light measuring section 131 disposed in a line. In the second embodiment, there are also more than two film carriers each having a film unwinding-rewinding section 140, a film transporting section 141 and an exposure opening 132 which may have substantially the same construction as for the film carriers 35 and 36 of the first embodiment, but having first and second film reservoirs 142 and 143. One of these film carriers is selectively placed in the printing line, as shown schematically in FIG. 9. The light measuring section 131 is disposed farther than the printing section 130 from the film unwinding-rewinding section 140, and the first film reservoir 142 is disposed between the exposure opening 132 and the second film reservoir 143.

A storage cartridge 31 containing a developed photographic film 13 is placed on a first of the film carriers which is placed in a position retracted from the printing line, so that the photographic film 13 is unwound and drawn out from the cartridge 31 to be accumulated in the second film reservoir 143 as a film loop. Next, when the first film carrier is moved into the printing line, the photographic film 13 accumulated in the second film reservoir 143 is wound back into the storage cartridge 31. During rewinding the photographic film 13, pixels of each image frame passing through the light measuring section 131 are measured to detect photometric image signals, so as to calculate a print-exposure amount for each image frame based on the image signals.

After passing through the light measuring section 131, each image frame is placed properly into an exposure position of the printing section 130, wherein the image frame is printed onto color paper 92. The first film reservoir 142 accumulates a predetermined length of film so as to compensate for the difference between film transporting speed in the light measuring section 131 and that in the printing section 130. While the photographic film 13 placed in the printing line is subjected to light measurement and printing, a second of the film carriers placed in the retracted position ejects a storage cartridge into which a photographic film has been rewound after printing, and places another storage cartridge, from which another photographic film is then unwound and drawn out. Upon completion of printing of the photographic film 13, the first film carrier is displaced from the printing line and, simultaneously, the second film carrier is placed into the printing line.

Figure 10:
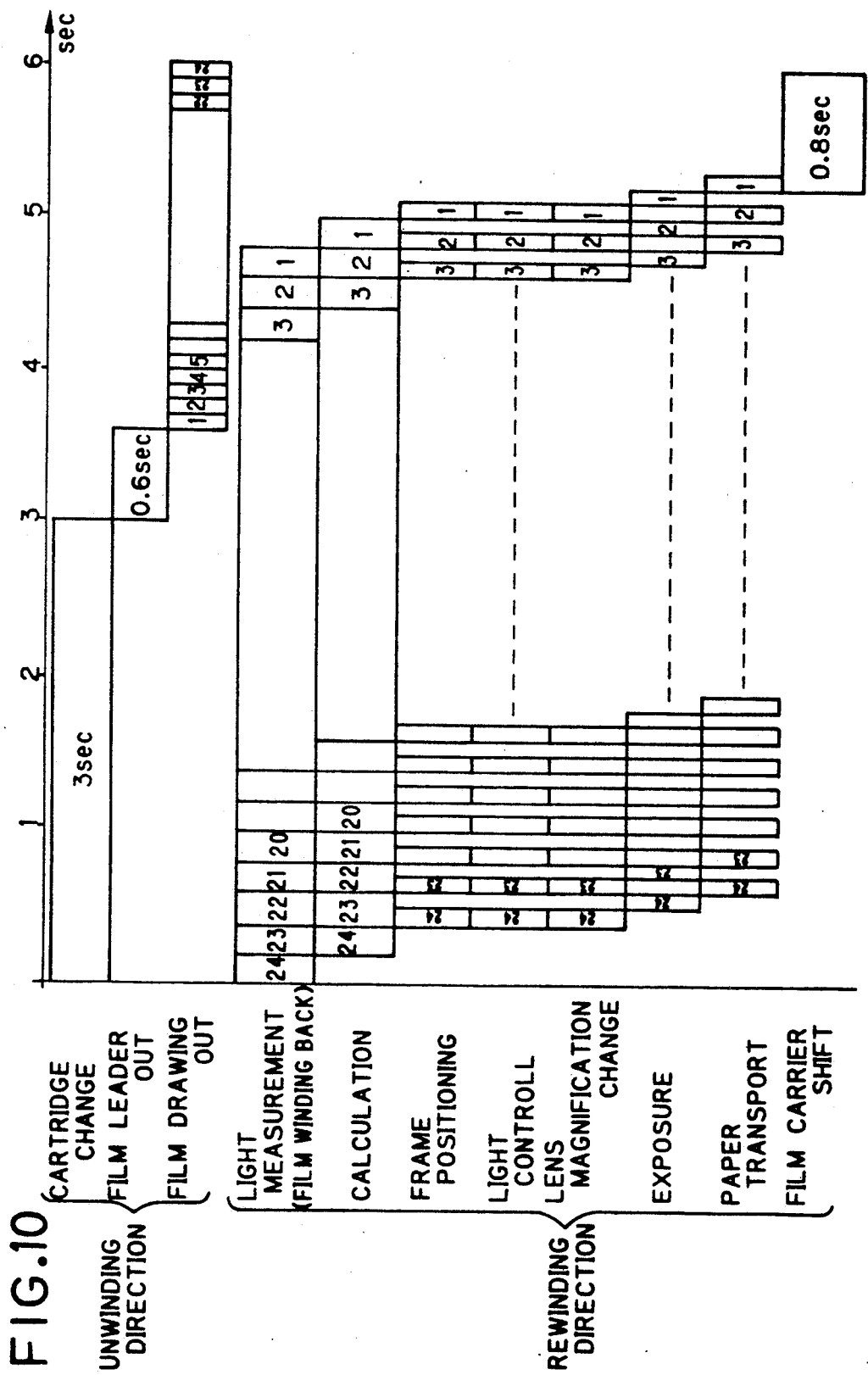
FIG. 10 is a timing chart of operation of the second embodiment.

The above-described procedure is illustrated as timing charts in FIG. 10. Although the timing charts of FIG. 10 relate to a case where two film carriers are provides, it is of course possible to provide three or more film carriers. The second embodiment simplifies the construction of the auto-printer because it needs only one light measuring section.

Although the present invention has been described with reference to the preferred embodiments, it will be understood that the present invention should not be limited to the above-described embodiments, and various modifications are possible without departing from the scope and spirit of the appended claims.

What is claimed is:

1. A photographic printer comprising:
   first and second film carriers having film passage ways respectively, said first and second film passage ways extending parallel to each other, said first and second film carrier each having a film transporting device positioned therein so as to transport a photographic film along a respective of said film passage ways, the photographic film being drawn out from a film cartridge placed into at least one of said first and second film carriers;
   a shifter operatively coupled to said first and second film carriers so as to shift said first and second film carriers in a direction perpendicular to said film passage ways so as to place one of the said first and second film carriers in an exposure position;
   a printer disposed in said exposure position so as to print each of a plurality of image frames of a photographic film transported along said film passage way of said one of said first and second film carriers which is placed in said exposure position; and
   a controller coupled with said shifter so as to activate said printer means in concert with said film transporting device of said one of said film carriers so as to rewind a first photographic film therein back into a first film cartridge, while activating said film transporting device of the other of said film carriers so as to draw out a second photographic film from a second film cartridge placed in the other of said film carriers.

2. A photographic printer as recited in claim 1, wherein said first and second film cartridges are constructed so as to be capable of propelling a leader portion of said first and second photographic films outwards by rotating a spool of said film cartridge in an unwinding direction, and wherein each of said film transporting devices comprises a film unwinding-rewinding mechanism removably coupled to said spools for propelling said leader portions outside of said film cartridges and for rewinding said leader portion back into said film cartridge, and a film feeding mechanism for transporting the photographic film.

3. A photographic printer as recited in claim 2, further comprising:
   a cartridge replacing device coupled to said first and second film carriers so as to eject a film cartridge, into which a photographic film has been rewound after printing, from one of said first and second film carriers, and placing another film cartridge into said one of said first or second film carrier while said first or second film carrier is displaced from said exposure position.

4. A photographic printer as recited in claim 3, wherein said first and second film carriers each further include a film accumulating device for accumulating the photographic film drawn out from said film cartridges, said film accumulating device being disposed on an end of said film passage way whereas said film cartridges are disposed on another end of said film passage way.

5. A photographic printer as recited in claim 4, further comprising light measuring means for measuring said image frames before printing said image frames in said exposure position, so as to calculate respective print-exposure amounts for said image frames.

6. A photographic printer as recited in claim 5, wherein said light measuring means is coupled to said controller so as to be actuated during drawing out said second photographic film from said second film cartridge.

7. A photographic printer as recited in claim 6, wherein said light measuring means include first and second light measuring devices disposed on opposite sides of said exposure position in the direction perpendicular to said film passage ways, such that one of said film carriers is placed in a position corresponding to said first light measuring device while the other of said film carriers is placed in said exposure position, and the other of said film carriers is placed in a position corresponding to the second light measuring device while said one of said film carriers is placed in said exposure position.

8. A photographic printer as recited in claim 7, wherein each of said first and second light measuring devices comprises a lamp, a light measuring mask having a slit formed therein, said slit traversing the film transporting direction, a CCD line sensor and a lens for focusing light projected from said lamp and passing though each of said image frames onto said CCD line sensor, said CCD line sensor being positioned so as to detect image signals corresponding to said image frames line by line during drawing out of the photographic film.

9. A photographic printer as recited in claim 5, wherein said light measuring means is coupled to said controller so as to be actuated during rewinding the photographic film into said film cartridges.

10. A photographic printer as recited in claim 6, wherein said light measuring means is disposed in the same line as said exposure position, said line extending parallel to said film passage ways.

11. A photographic printer as recited in claim 10, wherein said light measuring means comprises a lamp for projecting light toward each of said image frames, a light measuring slit, a CCD sensor, and a lens for focusing light passing through each of said image frames onto said CCD sensor.

12. A photographic printer as recited in claim 11, wherein each of the first and second film carriers is constructed so as to compensate for a difference between a first film transporting speed through said light measuring means and a film transporting speed through said printing means.

13. A photographic printer for making prints using film cartridges from each of which a leader portion of a photographic film can be propelled out by rotating a spool of the cartridge in an unwinding direction, said photographic printer comprising:
- a film carrier having a film inlet-outlet section for rotating the spool of the cartridge so as to propel out the film leader and to rewind the photographic film back into the cartridge, a film transporting section for transporting the photographic film along a film passage way, an exposure opening formed in said film passage way, and a film reservoir located proximate said film passage way so as to accumulate the photographic film drawn out by said film transporting section;
- a table supporting a plurality of said film carriers in positions parallel to each other;
- a printer positioned so as to project an image corresponding to each of said image frames placed on said exposure opening onto photosensitive paper, so as to make photographic prints;
- a shifting device coupled to said table so as to shift said table so as to place said exposure opening of one of said plurality of film carriers in an exposure position of said printing means; and
- a controller coupled to said printer, said film carriers and said shifting device such that the one film carrier whose exposure opening is placed in said exposure position performs alternately a printing step and a film rewinding step into the film cartridge, while the other film carrier whose exposure opening is displaced from said exposure position performs a cartridge replacing step, a film propelling and drawing out step, as preparatory steps for printing.

14. A photographic printing method comprising the steps of:
- displacing a first film carrier from an exposure position simultaneously with placing a second film carrier into said exposure position;
- placing a second film cartridge onto said second film carrier;
- drawing out a second photographic film from said second film cartridge;
- printing each image frame of said first photographic film; and
- rewinding said first photographic film back into said first film cartridge by one frame after each printing step.

15. A photographic printing method as recited in claim 14, further comprising the steps of:
- measuring image frames of said second photographic film during said drawing step; and
- calculating a print-exposure amount for each of said image frames of said second photographic film based on a measured value.

16. A photographic printing method as recited in claim 14, further comprising the steps of:
- measuring image frames of said first photographic film during said rewinding step before said printing step; and
- calculating a print-exposure amount for each of said image frames of said first photographic film based on a result of measurement.

* * * * *